(12) United States Patent
Takahashi et al.

(10) Patent No.: US 8,314,532 B2
(45) Date of Patent: Nov. 20, 2012

(54) DRIVE DEVICE

(75) Inventors: Hiroki Takahashi, Ome (JP); Takahiro Mizushina, Kawagoe (JP)

(73) Assignee: Casio Computer Co., Ltd., Tokyo (JP)

( * ) Notice: Subject to any disclaimer, the term of this patent is extended or adjusted under 35 U.S.C. 154(b) by 197 days.

(21) Appl. No.: 12/942,268

(22) Filed: Nov. 9, 2010

(65) Prior Publication Data

US 2011/0109197 A1    May 12, 2011

(30) Foreign Application Priority Data

Nov. 12, 2009    (JP) ................................ 2009-258470

(51) Int. Cl.
  *H01L 41/08*    (2006.01)
(52) U.S. Cl. .................................................. 310/323.02
(58) Field of Classification Search ............... 310/323.02
  See application file for complete search history.

(56) References Cited

U.S. PATENT DOCUMENTS

| | | | | |
|---|---|---|---|---|
| 4,782,262 A * | 11/1988 | Kiyo-Oka | ................. | 310/323.02 |
| 5,332,941 A * | 7/1994 | Honda | ..................... | 310/323.02 |
| 6,201,340 B1 | 3/2001 | Matsuda et al. | | |
| 6,741,011 B1 * | 5/2004 | Kleindiek | ................ | 310/323.02 |
| 7,268,464 B2 | 9/2007 | Kishi | | |
| 2010/0295418 A1 * | 11/2010 | Blume et al. | ............. | 310/323.02 |
| 2011/0241485 A1 * | 10/2011 | Nagase et al. | ........... | 310/323.02 |

FOREIGN PATENT DOCUMENTS

| | | |
|---|---|---|
| JP | 4-331478 A | 11/1992 |
| JP | 11-150964 A | 6/1999 |
| JP | 2000-139086 A | 5/2000 |
| JP | 2004-187384 A | 7/2004 |
| JP | 2005-031622 A | 2/2005 |
| JP | 2005-091782 A | 4/2005 |
| JP | 2005-124280 A | 5/2005 |
| JP | 2005-130637 A | 5/2005 |
| JP | 2005-328628 A | 11/2005 |
| JP | 2007-004121 A | 1/2007 |
| JP | 2007-053832 A | 3/2007 |
| JP | 2007-256819 A | 10/2007 |
| JP | 2008-199755 A | 8/2008 |
| JP | 2008-295287 A | 12/2008 |

OTHER PUBLICATIONS

Japanese Office Action dated Aug. 30, 2011 (and English translation thereof) in counterpart Japanese Application No. 2009-258470.

\* cited by examiner

*Primary Examiner* — Mark Budd
(74) *Attorney, Agent, or Firm* — Holtz, Holtz, Goodman & Chick, PC

(57) ABSTRACT

A drive device includes a stator; a rotatably provided drive member; a piezoelectric element, which is nipped between the stator and the drive member in a tangential line direction of a rotation locus circle of the drive member, and expands and contracts in the tangential line direction at an expansion speed at the time of the expansion and a contraction speed at the time of the contraction, respectively, the expansion speed and the contraction speed different from each other; and a rotor provided concentrically with the drive member to touch the drive member with a pressure.

7 Claims, 9 Drawing Sheets

FIG. 5A
FIG. 5B
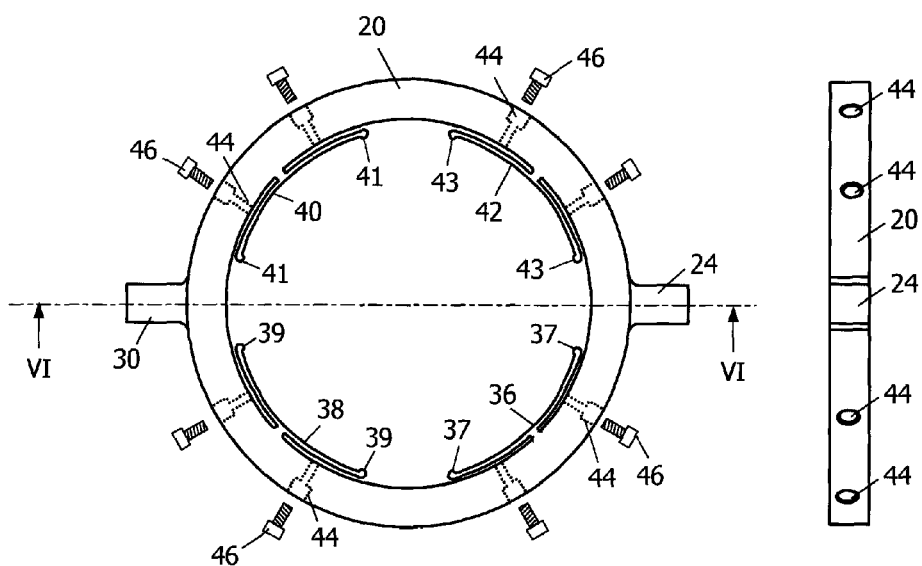
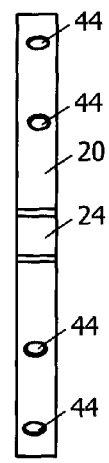
FIG. 6
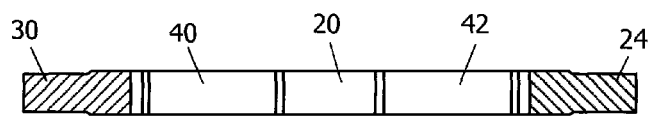

DRIVE DEVICE

BACKGROUND OF THE INVENTION

1. Field of the Invention

The present invention relates to a drive device, and more particularly to a drive device using a piezoelectric element.

2. Description of the Related Art

A digital camera or the like moves the lenses of a lens unit in the optical axis direction thereof for the zooming, the focusing, and the like of the lens unit. An electromagnetic motor is used as a power source of the movement (see, for example, Patent Literature 1: Japanese Patent Application Laid-Open Publication No. 2005-91782). Because the electromagnetic motor generates noise at the time of a drive thereof, however, there is the problem of resulting in recording the noise of the electromagnetic motor at the time of moving the lenses with the electromagnetic motor at the time of photographing a moving image. On the other hand, an ultrasonic motor, generating less noise is used for moving lenses. Because the ultrasonic motor utilizes the resonance phenomenon of a piezoelectric element, however, the size, the form, the dimensions, and the like of the piezoelectric element are required to be highly accurate at the time of manufacturing the ultrasonic motor. Consequently, it is hard to mass-produce ultrasonic motors inexpensively.

Furthermore, there is a motor described in Patent Literature 2 (Japanese Patent Application Laid-Open Publication No. 2005-130637) as a motor using a piezoelectric element. To put it concretely, piezoelectric elements (1a, 1b) are superposed on a rotation body (3), and the bending and the restoring of the piezoelectric elements (1a, 1b) are repeated. The bending of the piezoelectric elements (1a, 1b) at a low speed, here, causes no slips between the piezoelectric elements (1a, 1b) and the rotation body (3), and the rotation body (3) rotates. After that, the piezoelectric elements (1a, 1b) are restored at a high speed, and a slip is thereby caused between the piezoelectric elements (1a, 1b) and the rotation body (3), and the rotation body (3) does not rotate.

The technique described in Patent Literature 2, however, realizes the bending of the piezoelectric elements (1a, 1b) by providing the piezoelectric elements (1a, 1b) in the rotation axis direction of the rotation body (3) over a long distance. Consequently, the thickness of the whole device is led to increase in the rotation axis direction.

Furthermore, because the bending of the piezoelectric elements (1a, 1b) makes the lengths of the piezoelectric elements (1a, 1b) along the rotation axis direction of the rotation body (3) change, the rotation body (3) is led to vibrate in the rotation axis direction.

Accordingly, it is an object of the present invention to enable the length of a drive device along the rotation axis direction of the rotor of the rotation body (3) and the like to be made to small, and to make vibrations of the rotor like that not generate.

SUMMARY OF THE INVENTION

According to an aspect of the present invention, a drive device comprises: a stator; a rotatably provided drive member; a piezoelectric element, which is nipped between the stator and the drive member in a tangential line direction of a rotation locus circle of the drive member, and expands and contracts in the tangential line direction at an expansion speed at a time of expansion and a contraction speed at a time of contraction, respectively, the expansion speed and the contraction speed different from each other; and a rotor, provided concentrically with the drive member to touch the drive member with a pressure.

BRIEF DESCRIPTION OF THE DRAWINGS

FIG. 5A is a plan view of a drive member of the drive device according to the same embodiment;

FIG. 5B is a side view of the drive member of the drive device according to the same embodiment;

FIG. 6 is a sectional view of a surface taken along a line VI-VI shown in FIG. 5A when the surface is viewed from the arrow directions;

DETAILED DESCRIPTION OF THE PREFERRED EMBODIMENTS

In the following, the modes for carrying out the present invention will be described with reference to the accompanying drawings. In addition, although various technically preferable limitations for carrying out the present invention are added to the following embodiments, those limitations do not limit the scope of the invention to the following embodiments and shown examples.

First Embodiment

Figure 1:
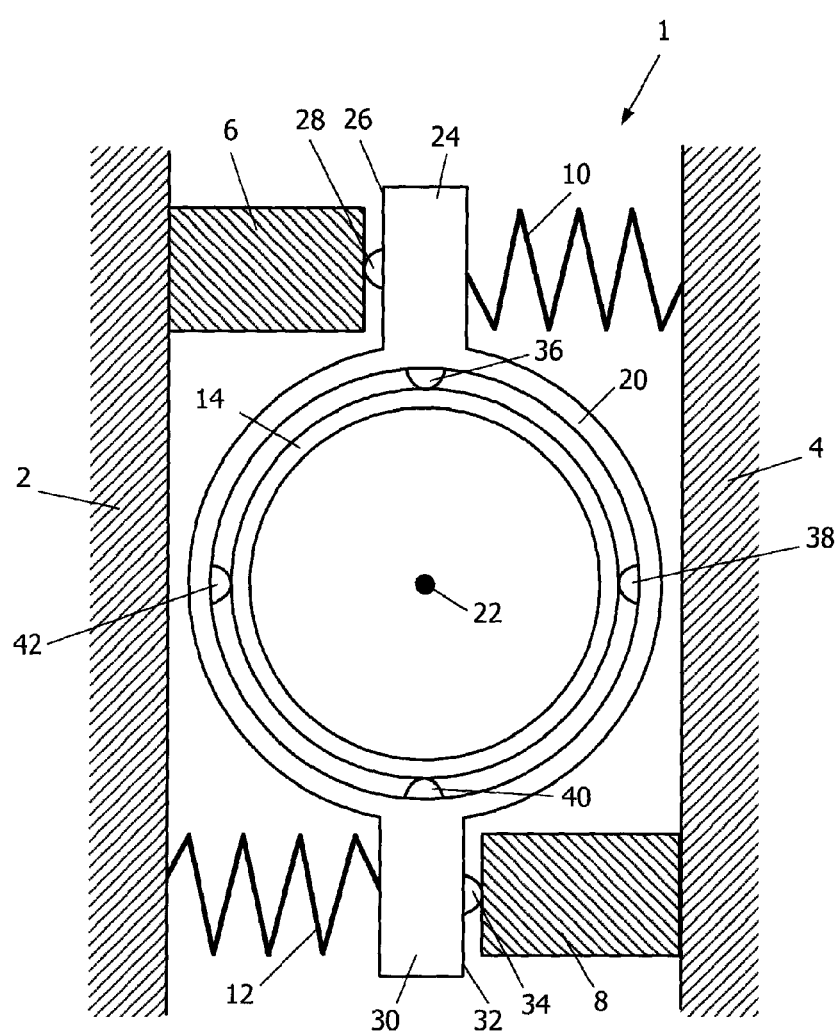
FIG. 1 is a plan view of a drive device according to a first embodiment of the present invention.

FIG. 1 is a plan view showing a drive device 1.

As shown in FIG. 1, stators 2 and 4 are provided in an arrangement with an interval from each other, and piezoelectric elements 6 and 8, compression springs 10 and 12, a rotor 14, and a drive member 20 are arranged between the stators 2 and 4.

The drive member 20 is formed in a ring or a cylinder. The drive member 20 is adapted to be relatively rotatable to the stators 2 and 4. The drive member 20 is provided with drive arms 24 and 30 on the outer peripheral surface thereof. These drive arms 24 and 30 extend from the drive member 20 in the external directions of the diameter thereof. These drive arms 24 and 30 are arranged at positions opposed to each other with the center 22 of the drive member 20 put between them. A hemispherical projection 28 is provided to project from a surface 26 of the drive arm 24 on the side of the stator 2 thereof. A hemispherical projection 34 is provided to project from a surface 32 of the drive arm 30 on the side of the stator 4 thereof.

Hemispherical elastic bodies 36, 38, 40, and 42 are provided to project from the inner peripheral surface of the drive member 20. These elastic bodies 36, 38, 40, and 42 are arranged along the circumferential direction of the drive member 20 with the intervals of 90° around the center 22.

The piezoelectric elements 6 and 8 are arranged on the outside of the radial direction of the drive member 20. The piezoelectric element 6 on one side is nipped between the stator 2 and the drive arm 24 in the tangential line direction of a rotation locus circle of the drive member 20 (a circle regulated by the outer peripheral surface drive member 20). One end of the piezoelectric element 6 is fixed to the stator 2, and the piezoelectric element 6 extends toward the stator 4 on the opposite side in the tangential line direction of the rotation locus circle of the drive member 20. The other end of the piezoelectric element 6 abuts against the projection 28. The piezoelectric element 8 on the other side is nipped between the stator 4 and the drive arm 30 in the tangential line direction of the rotation locus circle of the drive member 20. One end of the piezoelectric element 8 is fixed to the stator 4, and the piezoelectric element 8 extends toward the stator 2 on the opposite side along the tangential line direction of the rotation locus circle of the drive member 20. The other end of the piezoelectric element 8 abuts against the projection 34.

Each of the piezoelectric elements 6 and 8 is adapted to receive the application of a voltage, and each of the piezoelectric elements 6 and 8 expands and contracts in accordance with the applied voltage. To put it concretely, each of the piezoelectric elements 6 and 8 expands and contracts in a direction parallel to the rotation surface of the drive member 20 (a surface perpendicular to the rotation axis of the drive member 20) and in the tangential line direction of the rotation locus circle of the drive member 20.

Each of the piezoelectric elements 6 and 8 is configured by laminating a plurality of unit piezoelectric bodies in its expansion and contraction direction. Consequently, even if a voltage applied to each of the piezoelectric elements 6 and 8 is small, the displacement of the expansion and contraction of each of the piezoelectric elements 6 and 8 can be enlarged.

The compression spring 10 is an urging section to urge the drive member 20 in order to compress the piezoelectric element 6 along the tangential line direction of the rotation locus circle of the drive member 20. The compression spring 12 is an urging section to urge the drive member 20 in order to compress the piezoelectric element 8 along the tangential line direction of the rotation locus circle of the drive member 20.

To put it concretely, the compression spring 10 is nipped between the stator 4 and the drive arm 24, and the compression spring 12 is nipped between the stator 2 and the drive arm 30. The compression spring 10 is made to be in a slightly compressed state, and the piezoelectric element 6 receives a compressing load caused by the compression spring 10. The compression spring 12 is made to be in a slightly compressed state, and the piezoelectric element 8 receives a compressing load caused by the compression spring 12. The balance between the loads is hereby attained.

Furthermore, the drive member 20 receives a counterclockwise moment, when it is viewed from the direction shown in FIG. 1, by the compression springs 10 and 12, and the balance of the moment is attained by the reception of the moment by the piezoelectric elements 6 and 8 and the stators 2 and 4.

The rotor 14 is formed in a ring, a cylinder, a circular plate, or a column. The rotor 14 is embedded in the drive member 20, and the rotor 14 is inscribed in the drive member 20. The drive member 20 and the rotor 14 are concentrically provided. The rotor 14 is made to be relatively rotatably to the stators 2 and 4. The vertexes of the elastic bodies 36, 38, 40, and 42 touches the outer peripheral surface of the rotor 14 in point contact, and the rotor 14 touches the drive member 20 with a pressure with the elastic bodies 36, 38, 40, and 42 intervening between them. The intervening of the elastic bodies 36, 38, 40, and 42 enables the frictional force between the rotor 14 and the drive member 20 to be moderate.

In addition, although the elastic bodies 36, 38, 40, and 42 are provided integrally with the drive member 20, the elastic bodies 36, 38, 40, and 42 may be separated bodies from the drive member 20. In this case, the elastic bodies 36, 38, 40, and 42 are nipped between the drive member 20 and the rotor 14. Furthermore, although the elastic bodies 36, 38, 40, and 42 are provided to project from the inner peripheral surface of the drive member 20, the elastic bodies 36, 38, 40, and 42 may be provided to project from the outer peripheral surface of the rotor 14.

If the drive member 20 is formed in a ring and the rotor 14 is formed in a ring or a circular plate, their thicknesses in the direction along their rotation axes (the lengths in the direction perpendicular to the paper surface of FIG. 1) are preferably equal to each other, and both the end surfaces of the drive member 20 and the rotor 14 in their rotation axis directions are preferably in line with each other. By such a configuration, the length of the drive device 1 in the direction along the rotation axes of the drive member 20 and the rotor 14 can be made to be short, and the drive device 1 can be made to be thinned. Also in the case where the drive member 20 is formed in a cylinder and the rotor 14 is formed in a cylinder or a column, both the end surfaces of the drive member 20 and the rotor 14 in their rotation axis directions are preferably in line with each other.

Figure 2:
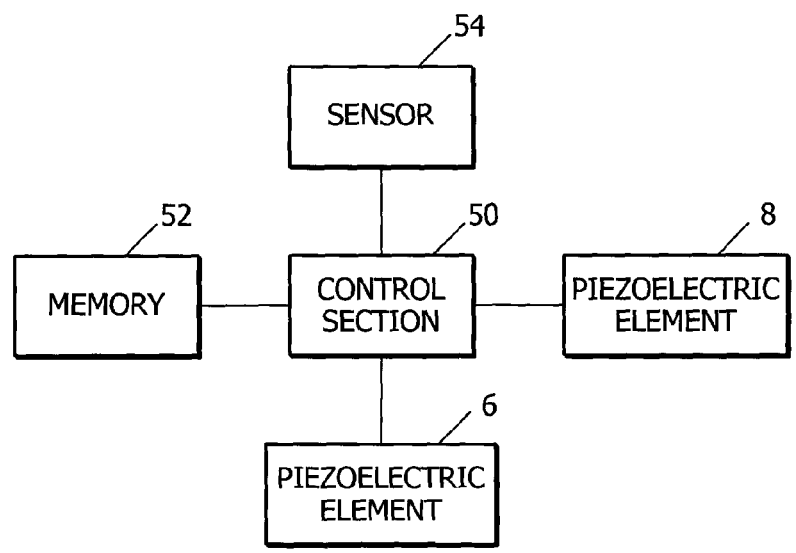
FIG. 2 is a block diagram of the circuits of the drive device according to the same embodiment.

FIG. 2 is a block diagram showing the circuits of the drive device 1.

A control section 50 is a computer, including a central processing unit (CPU), a random access memory (RAM), and the like, and outputs control signals to the piezoelectric elements 6 and 8 in accordance with a program recorded in a memory 52 to expand and contract the piezoelectric elements 6 and 8. A sensor 54 detects a rotation angle and a rotation position of the rotor 14. For example, the sensor 54 is an encoder to output a pulse signal to the control section 50 every rotation of the rotor 14 by a predetermined unit angle. The control section 50 starts outputting control signals to the piezoelectric elements 6 and 8 or stops the outputting of the control signals on the basis of a detection result of the sensor 54. In addition, the control section 50 may be a logic circuit or an electric circuit in place of the computer.

Figure 3A:
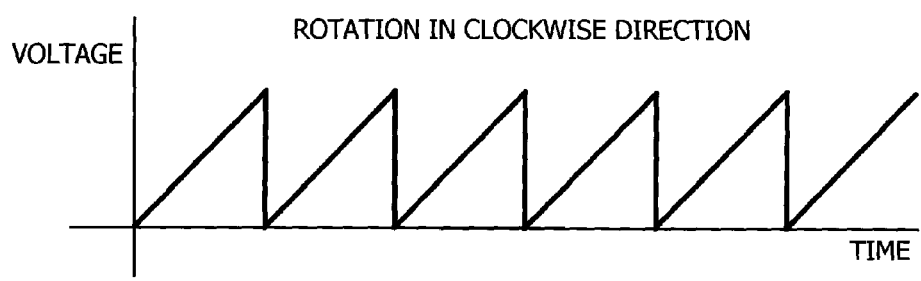
FIG. 3A is a chart of a control signal output by the control section of the drive device according to the same embodiment.
Figure 3B:
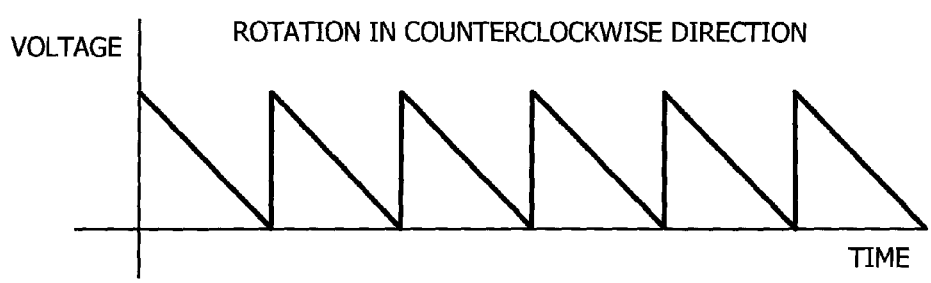
FIG. 3B is a chart of a control signal output by the control section of the drive device according to the same embodiment.

FIGS. 3A and 3B are charts showing control signals output to the piezoelectric elements 6 and 8 by the control section 50. The control section 50 applies voltages to the piezoelectric elements 6 and 8 by outputting the control signals to the piezoelectric elements 6 and 8. Each of the control signals is a waveform signal in order that each of the applied voltages to the piezoelectric elements 6 and 8 may vibrate between a high voltage and a low voltage, and that a rising speed and a falling speed of the applied voltage in one period are different from each other. In FIG. 3A, the rising speed of the applied voltage to each of the piezoelectric elements 6 and 8 is slower than the falling speed thereof. In FIG. 3B, the rising speed of the applied voltage to each of the piezoelectric elements 6 and 8 is faster than the falling speed thereof. In addition, the frequencies of the control signals are preferably within an ultrasonic range (for example, 16 kHz or more).

When a control signal as shown in FIG. 3A is output to the piezoelectric elements 6 and 8 by the control section 50, the rotor 14 clockwise rotates in FIG. 1. On the other hand, when a control signal as shown in FIG. 3B is output to the piezoelectric elements 6 and 8 by the control section 50, the rotor 14 counterclockwise rotates in FIG. 1. In the following, the operations will concretely be described.

As shown in FIG. 3A, when the control section 50 raises the applied voltages to the piezoelectric elements 6 and 8, the piezoelectric elements 6 and 8 expand against the loads of the compression springs 10 and 12, respectively. Accompanying the expansion of the piezoelectric elements 6 and 8, the drive member 20 clockwise rotates. At this time, because the rising speeds of the applied voltages to the piezoelectric elements 6 and 8 are slow, the expansion speeds of the piezoelectric elements 6 and 8 are slow, and the rotation speed of the drive member 20 is also slow. Consequently, also the rotor 14 clockwise rotates by the friction between the elastic bodies 36, 38, 40, and 42 and the rotor 14.

Then, when the applied voltages to the piezoelectric elements 6 and 8 become the high voltages, the control section 50 makes the applied voltages to the piezoelectric elements 6 and 8 descend. By the descending of the applied voltages to the piezoelectric elements 6 and 8, the piezoelectric elements 6 and 8 contract. When the piezoelectric elements 6 and 8 contract, the drive member 20 rapidly reverses by the loads of the compression springs 10 and 12 to rotate counterclockwise. At this time, because the applied voltages to the piezoelectric elements 6 and 8 rapidly descend, the piezoelectric elements 6 and 8 rapidly contract, and their contraction speeds are fast. Then, the rotation speed of the drive member 20 is also fast.

Consequently, slips are caused between the elastic bodies 36, 38, 40, and 42 and the rotor 14, and the rotor 14 does not counterclockwise rotate (the rotor 14 slightly rotate counterclockwise under some conditions, but the rotation angle thereof is sufficiently small in comparison with the previous clockwise rotation angle).

Consequently, the rotor 14 clockwise rotates by repeating the operations of raising the applied voltages to the piezoelectric elements 6 and 8 at a low speed before making the applied voltages to the piezoelectric elements 6 and 8 descend at a high speed as shown in FIG. 3A with the control section 50.

On the other hand, as shown in FIG. 3B, when the control section 50 raises the applied voltages to the piezoelectric elements 6 and 8, the piezoelectric elements 6 and 8 expand against the loads of the compression springs 10 and 12, respectively. When the piezoelectric elements 6 and 8 expand, the drive member 20 clockwise rotates. At this time, because the applied voltages to the piezoelectric elements 6 and 8 rapidly rise, the piezoelectric elements 6 and 8 rapidly expand, and the expansion speeds of the piezoelectric elements 6 and 8 are fast. Then, the rotation speed of the drive member 20 is also fast. Consequently, slips are cased between the elastic bodies 36, 38, 40, and 42 and the rotor 14, and the rotor 14 does not rotate clockwise (the rotor 14 slightly rotates clockwise under some conditions, but the rotation angle thereof is sufficiently small).

Then, when the applied voltages to the piezoelectric elements 6 and 8 become the high voltages, the control section 50 makes the applied voltages to the piezoelectric elements 6 and 8 descend, and the piezoelectric elements 6 and 8 contract. When the piezoelectric elements 6 and 8 contract, the drive member 20 accordingly counterclockwise rotates by the loads of the compression springs 10 and 12. At this time, because the falling speeds of the applied voltages to the piezoelectric elements 6 and 8 are slow, the contraction speeds of the piezoelectric elements 6 and 8 are slow, and the rotation speed of the drive member 20 is also slow. Consequently, also the rotor 14 counterclockwise rotates by the friction between the elastic bodies 36, 38, 40, and 42 and the rotor 14.

Consequently, the rotor 14 counterclockwise rotates by repeating the operations of raising the applied voltages to the piezoelectric elements 6 and 8 at a high speed before making the applied voltages to the piezoelectric elements 6 and 8 descend at a low speed as shown in FIG. 3B with the control section 50.

In addition, the control section 50 may control the amplitudes of the control signals (the differences between their high voltages and their low voltages) to the piezoelectric elements 6 and 8 or may control the periods or frequencies of the control signals on the basis of the detection results of the sensor 54. By the control of the amplitudes, and the periods or frequencies of the control signals, the rotation speed of the rotor 14 is controlled.

The drive device 1 can be used as power sources of the focusing mechanism, the zooming mechanism, and the retracting and extending mechanism of a lens unit. In order to use the drive device 1 as the power source of a lens unit, for example, the lens barrel and the cam barrel of the lens unit are integrally provided in the rotor 14 concentrically with the rotor 14, or the lens barrel and the cam barrel are embedded in the drive member 20 as the rotor 14. In such a configuration, the lens barrel and the like move in the direction along the rotation axis of the rotor 14 by the rotation of the rotor 14 (the lens barrel and the com barrel) caused by the expansion and the contraction of the piezoelectric elements 6 and 8.

As described above, according to the present embodiment, the piezoelectric elements 6 and 8 are arranged on the outside of the drive member 20, and consequently the drive device 1 can be thinned. That is, the length of the drive device 1 in the direction perpendicular to the paper surface of FIG. 1 can be reduced.

Furthermore, because the expansion and contraction directions of the piezoelectric elements 6 and 8 are the directions parallel to the rotation surfaces of the drive member 20 and the rotor 14, the drive device 1 can be thinned.

In particular, even though the piezoelectric elements 6 and 8 are formed in lamination type ones in order to enlarge the displacement of the expansion and contraction of the piezoelectric elements 6 and 8, the piezoelectric elements 6 and 8 are not elongated in the direction perpendicular to the paper surface of FIG. 1, but the piezoelectric elements 6 and 8 are elongated in the direction parallel to the rotation surfaces of the drive member 20 and the rotor 14. Consequently, the thinning of the drive device 1 can be achieved.

Furthermore, the expansion and the contraction of the piezoelectric elements 6 and 8 in the direction parallel to the rotation surfaces of the drive member 20 and the rotor 14 make the drive member 20 and the rotor 14 rotate, and consequently it can be prevented that the drive member 20 and the rotor 14 move in the direction along the rotation axes owing to the deformations of the piezoelectric elements 6 and 8.

Furthermore, because the ends of the piezoelectric elements 6 and 8 are not fixed to the drive arms 24 and 30, respectively, the ends of the piezoelectric elements 6 and 8 are made to be movable in the radial direction of the drive member 20 to the drive arms 24 and 30, respectively. In particular, the projections 28 and 34 are provided to the drive arms 24 and 30, respectively, and the contact areas of the ends of the piezoelectric elements 6 and 8 and the projections 28 and 34, respectively, are reduced to make it easy that the ends of the piezoelectric elements 6 and 8 slip from the projections 28 and 34, respectively. Consequently, even if the piezoelectric elements 6 and 8 expand and contract to rotate the drive member 20, the ends of the piezoelectric elements 6 and 8 relatively move against the drive arms 24 and 30 and projections 28 and 34, respectively, in the radial direction, and consequently the generation of bending of the piezoelectric elements 6 and 8 can be prevented.

Furthermore, if the frequencies of the control signals output to the piezoelectric elements 6 and 8 are in the ultrasonic range, the noise cannot be heard by human ears, and it is possible to provide the drive device 1 the operation sounds of which are silent.

Furthermore, because the rotator 14 is rotated by using the expansion and contraction of the piezoelectric elements 6 and 8, the drive device 1 can be manufactured even if the accuracy of the installation positions, the sizes, the forms, and the like of the rotor 14 and the drive member 20 is not so high in comparison with that of a ultrasonic motor using resonance. Consequently, the manufacturing cost of the drive device 1 can be made to be low.

Furthermore, because the control signals are signals vibrating between the high voltages and the low voltages, the power consumption of the drive device 1 can be reduced.

Furthermore, if the drive member 20 or the rotor 14 is formed in a cylinder, no projecting members exist on the outside of the drive member 20 except for the places at which the drive arms 24 and 30, the piezoelectric elements 6 and 8, and the compression springs 10 and 12 are installed. Consequently, the outer peripheral surface of the drive member 20 can be made to be a column surface except for the places where the drive arms 24 and 30, the piezoelectric elements 6 and 8, and the compression springs 10 and 12 are installed.

Furthermore, if the drive device 1 is used for a lens unit, the rotation motion of the rotor 14 of the drive device 1 is converted into direct acting motions of a lens barrel and the like, the positions of the lens barrel and the like in the direction along the rotation axis of the rotor 14 can minutely be controlled. That is, because the drive device 1 does not make the lens barrel and the like directly act, the positions of the lens barrel and the like can minutely be controlled.

Second Embodiment

Figure 4:
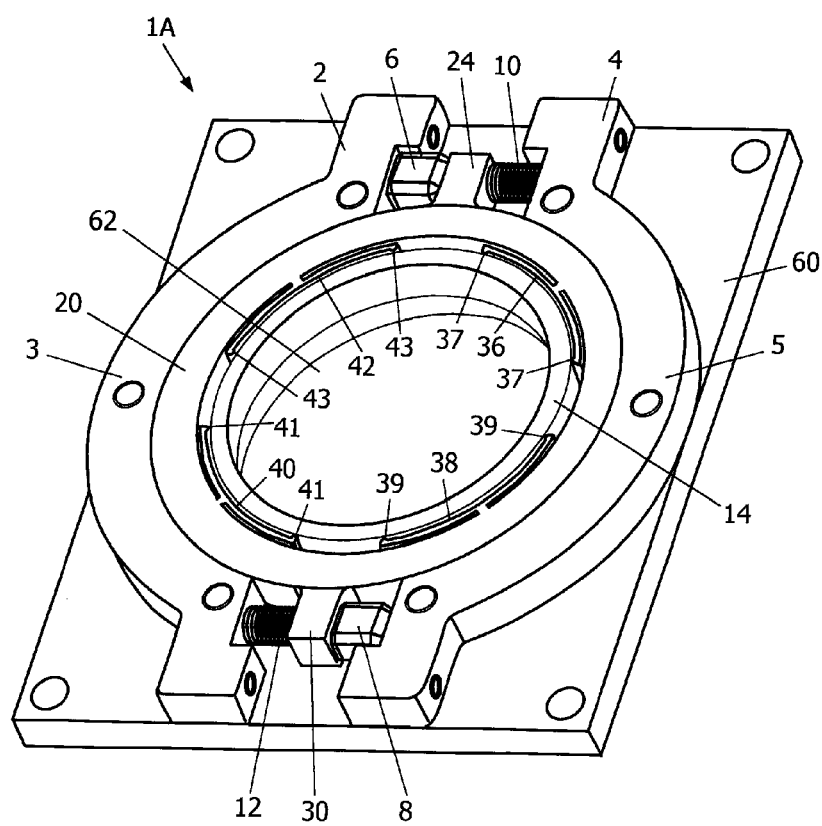
FIG. 4 is a perspective view of a drive device according to a second embodiment of the present invention.

FIG. 4 is a perspective view of a drive device 1A of a second embodiment. The parts of the drive device 1A of the second embodiment corresponding to those of the drive device 1 of the first embodiment are denoted by the same marks as those of the first embodiment.

As shown in FIG. 4, the stators 2 and 4 are attached on one surface of a base plate 60, and these stators 2 and 4 are provided with an interval between them. The central parts of the stators 2 and 4 in their lengthwise directions are bent in arcs, and the bent arc part 3 of the stator 2 and the bent arc part 5 of the stator 4 are concentrically provided.

A circular hole 62 is formed at the central part of the base plate 60, and the circular hole 62 penetrates the base plate 60 from one surface thereof to the other surface thereof. The circular hole 62 is provide to be arranged between the stators 2 and 4, and the circular hole 62 and the arc parts 3 and 5 of the stators 2 and 4, respectively, are concentrically provided.

The drive member 20 is placed between the arc parts 3 and 5 of the stators 2 and 4, respectively, on the base plate 60. The outer peripheral surface of the drive member 20 contacts with the inner peripheral surfaces of the arc parts 3 and 5, and the radial load of the drive member 20 is received by the arc parts 3 and 5. The drive member 20 is thus supported by the arc parts 3 and 5 rotatably.

As shown in FIG. 4, the drive arm 24 is arranged between the ends of the stators 2 and 4 on one side in their lengthwise directions, and the drive arm 30 is arranged between the other ends of the stators 2 and 4 in their lengthwise directions. The piezoelectric element 6 is nipped between the end of the stator 2 on the one side in its lengthwise direction and the drive arm 24, and the compression spring 10 is nipped between the end of the stator 4 on the one side in its lengthwise direction and the drive arm 24. The piezoelectric element 8 is nipped between the other end of the stator 4 in its lengthwise direction and the drive arm 30, and the compression spring 12 is nipped between the other end of the stator 2 in the lengthwise direction and the drive arm 30. The piezoelectric element 6 is fixed to the stator 2 and abuts against the drive arm 24. The piezoelectric element 8 is fixed to the stator 4 and abuts against the drive arm 30.

In addition, a hemispherical projection may be provided at a part of the drive arm 24 at which part the drive arm 24 contacts with the piezoelectric element 6. Furthermore, a hemispherical projection may be provided at a part of the drive arm 30 where the driver arm contacts with the piezoelectric element 8.

FIG. 5A is a plan view of the drive member 20, and FIG. 5B is a side view of the drive member 20. FIG. 6 is a sectional view of a surface taken along a line VI-VI shown in FIG. 5A when it is viewed from the arrows. As shown in FIGS. 5A and 6, the thin-plate-like elastic bodies 36, 38, 40, and 42 are provided on the inner peripheral surface side of the drive member 20. These elastic bodies 36, 38, 40, and 42 are bent in arcs along the inner peripheral surface of the drive member 20, and the central parts of these elastic bodies 36, 38, 40, and 42 connect with the inner peripheral surface of the drive member 20. Cylindrical projections 37, 39, 41, and 43 are provided to project from the inner surfaces of these elastic bodies 36, 38, 40, and 42 at their both the ends. A plurality of threaded holes 44 is formed on the inner peripheral surface of the drive member 20, and these threaded holes 44 penetrate the drive member 20 to the outer peripheral surface thereof. Adjusting screws 46 are rotated and fixed into the threaded holes 44, and the tips of these adjusting screws 46 project onto the inner periphery side of the drive member 20. Thus, the tips of the adjusting screws 46 abut against the elastic bodies 36, 38, 40, and 42. The heads of the adjusting screws 46 are inserted into the threaded holes 44, and the heads of the adjusting screws 46 do not project to the outer periphery side of the drive member 20.

The rotor 14 is embedded in the drive member 20, and the drive member 20 and the rotor 14 are provided concentrically. The elastic bodies 36, 38, 40, and 42 are plate springs, and the projections 37, 39, 41, and 43 of the elastic bodies 36, 38, 40, and 42 touch the outer peripheral surface of the rotor 14 with pressures. The pressures between the rotor 14 and the projections 37, 39, 41, and 43 can be adjusted with the adjusting screws 46. That is, if the adjusting screws 46 are tightened, the adjusting screws 46 extend into the inside of the drive member 20, and consequently the pressures between the rotor 14 and the projections 37, 39, 41, and 43 can be enlarged. If the adjusting screws 46 are loosened, the adjusting screws 46 are withdrawn into the threaded holes 44, and consequently the pressures between the rotor 14 and the projections 37, 39, 41, and 43 can be reduced.

The parts of drive device 1A of the second embodiment corresponding to those of the drive device 1 of the first embodiment are provided similarly to those of the drive device 1 except for the parts described above.

When control signals as shown in FIG. 3A are output to the piezoelectric elements 6 and 8 by the control section 50 also in the drive device 1A similarly in the drive device 1 of the first embodiment, the rotor 14 clockwise rotates. On the other hand, when the control signals as shown in FIG. 3B are output to the piezoelectric elements 6 and 8 by the control section 50, the rotor 14 counterclockwise rotates.

Also in the second embodiment, operations and effects similar to those of the first embodiment can be achieved. Furthermore, because the drive member 20 is supported by the arc parts 3 and 5 of the stators 2 and 4, respectively, the drive member 20 stably rotates. Furthermore, by adjusting the tightening force to the rotor 14 with the adjusting screws 46, the rotor 14 can suitably be rotated.

In addition, although the elastic bodies 36, 38, 40, and 42 are provided on the inner peripheral surface of the drive member 20, the elastic bodies 36, 38, 40, and 42 may be provided on the outer peripheral surface of the rotor 14. In this case, the threaded holes 44 are formed so as to penetrate the rotor 14 from its inner peripheral surface to its outer peripheral surface, the adjusting screws 46 are rotated and fixed into the threaded holes 44. The tips of the adjusting screws 46 project onto the outer periphery side of the rotor 14, and the tips abuts against the elastic bodies 36, 38, 40, and 42. By the tightening and the loosening of the adjusting screws 46, the pressures by the elastic bodies 36, 38, 40, and 42 can be adjusted.

Third Embodiment

Figure 7:
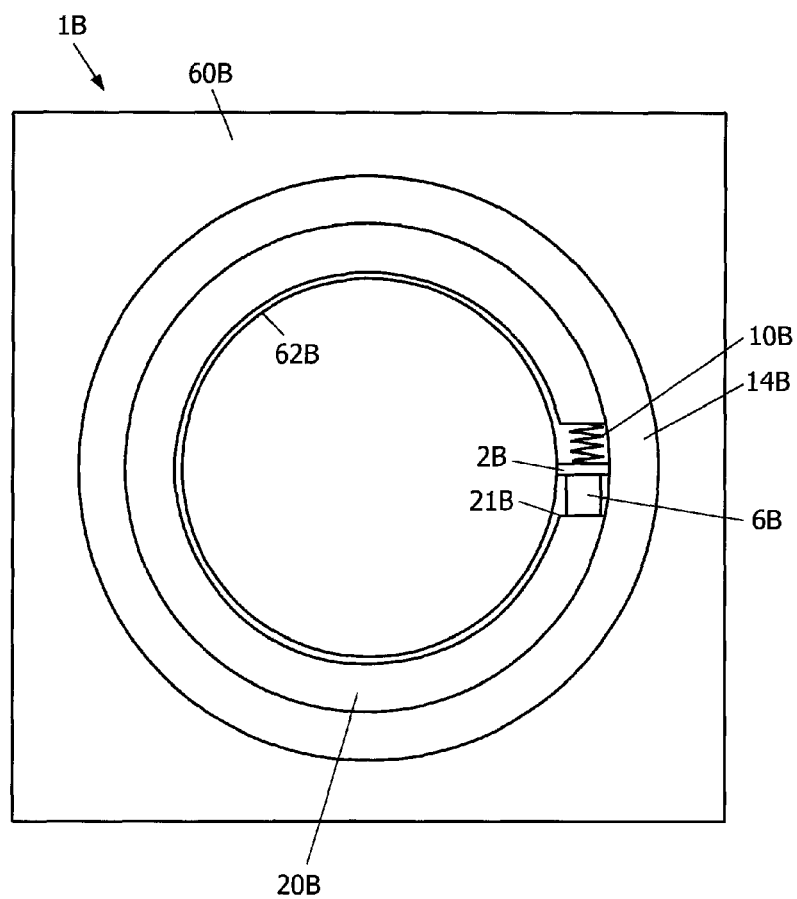
FIG. 7 is a plan view of a drive device according to a third embodiment of the present invention.

FIG. 7 is a plan view of a drive device 1B of a third embodiment.

As shown in FIG. 7, a circular hole 62B is formed at the central part of a base plate 60B, and the circular hole 62B penetrates the base plate 60B form one surface thereof to the other surface thereof.

A thin-plate-like stator 2B is attached to one surface of the base plate 60B, and the stator 2B is provided to the base plate 60B in a standing state thereon. The stator 2B is arranged in the vicinity of the edge of the circular hole 62B.

A ring-like or a cylindrical rotor 14B is placed on the base plate 60B in the way of enclosing the circular hole 62B, and the rotor 14B is arranged concentrically with the circular hole 62B. The rotor 14B is adapted to be rotatably around the center of the axis thereof relatively to the stator 2B and the base plate 60B. In addition, bearings are provided to the base plate 60B, and the radial load of the rotor 14B is received by the bearings. The rotor 14B is preferably made to be rotatable by being supported by the bearings.

A ring-like or cylindrical drive member 20B is placed on the base plate 60B in the way of enclosing the circular hole 62B. The drive member 20B is embedded in the rotor 14B, and the drive member 20B is inscribed in the rotor 14B. The drive member 20B is provided concentrically to the rotor 14B. The drive member 20B is adapted to be rotatable relatively to the stator 2B and the base plate 60B.

A cutout 21B is formed at a part of the drive member 20B, and the drive member 20B is formed in a letter C when it is viewed from its axial direction. The stator 2B is arranged in the cutout 21B. Furthermore, a piezoelectric element 6B and a compression spring 10B are arranged in the cutout 21B. The piezoelectric element 6B is nipped between one end of the drive member 20B in its circumferential direction and the stator 2B in the tangential line direction of the rotation locus circle of the drive member 20B, and the compression spring 10B is nipped between the other end of the drive member 20B in its circumferential direction and the stator 2B in the tangential line direction of the rotation locus circle of the drive member 20B here. One end of the piezoelectric element 6B is fixed to the stator 2B, and the other end of the piezoelectric element 6B abuts against the end of the drive member 20B in its circumferential direction. A hemispherical projection may be provided at the end of the drive member 20B in its circumferential direction at which end the drive member 20B contacts with the piezoelectric element 6B.

The compression spring 10B is made to be in a slightly compressed state, and the piezoelectric element 6B receives a compressing load of the compression spring 10B. The compression spring 10B is an urging section to urge the drive member 20B in order to compress the piezoelectric element 6B along the tangential line direction of the rotation locus circle of the drive member 20B.

The piezoelectric element 6B is configured to receive the application of a voltage, and the piezoelectric element 6B expands and contracts in accordance with the applied voltage. To put it concretely, the piezoelectric element 6B expands and contracts in the tangential line direction of the rotation locus circle of the drive member 20B, which direction is parallel to the surface perpendicular to the rotation axis of the drive member 20B. The piezoelectric element 6B is produced by laminating a plurality of unit piezoelectric bodies in its expansion and contraction direction.

The diameter of the outer periphery of the drive member 20B is slightly larger than that of the inner periphery of the rotor 14B in the state in which the drive member 20B is taken out from the rotor 14B. Then, the drive member 20B is embedded in the rotor 14B in the state of being compressed in its radial direction. Consequently, the drive member 20B touches the rotor 14b with a pressure caused by the elastic force of the drive member 20B.

Also the drive device 1B includes the control section 50, the memory 52, and the sensor 54, shown in FIG. 2, similarly to the drive device 1 and 1A of the first and the second embodiments, respectively.

When a control signal as shown in FIG. 3A is output to the piezoelectric element 6B by the control section 50, the piezoelectric element 6B repeats expansion and contraction, and the expansion speed of the piezoelectric element 6B is slower than the contraction speed of thereof. Consequently, the rotor 14B clockwise rotates. On the other hand, when a control signal as shown in FIG. 3B is output to the piezoelectric element 6B by the control section 50, the piezoelectric element 6B repeats expansion and contraction, and the expansion speed of the piezoelectric element 6B is faster than the contraction speed thereof. Consequently, the rotor 14B counterclockwise rotates. In addition, the frequencies of the control signals output from the control section 50 to the piezoelectric element 6B is preferably in an ultrasonic range noise in view of the prevention of noise.

The drive device 1B can be used as the power source of the focusing mechanism, the zooming mechanism, and the retracting and extending mechanism of a lens unit.

Also in the present embodiment, because the piezoelectric element 6B, the compression spring 10B, and the stator 2B are arranged in the cutout 21B of the drive member 20B, the drive device 1B can be made to be thin and miniaturized. In particular, the length of the drive member 20B in its radial direction can be shorter in comparison with that of the first embodiment.

Furthermore, because the expansion and contraction direction of the piezoelectric element 6B is the one parallel to the rotation surface of the drive member 20B and the rotor 14B, the drive device 1B can be thinned.

Furthermore, because the drive member 20B and the rotor 14B rotate by the expansion and the contraction of the piezoelectric element 6B in the direction parallel to the rotation surfaces of the drive member 20B and the rotor 14B, the movements of the drive member 20B and the rotor 14B in the direction along their rotation axes owing to the deformations of the piezoelectric element 6B can be prevented.

Furthermore, because the rotor 14B is rotated by using the expansion and the contraction of the piezoelectric element 6B, the rotor 14B can be rotated even if the accuracy of the installation positions, the sizes, the forms, and the like of the rotor 14B, the drive member 20B, and the like are not high.

Furthermore, because the control signal is the one vibrating between the high voltage and the low voltage, the reduction of the power consumption of the drive device 1B can be achieved.

In addition, in the state in which the drive member 20B is taken out from the rotor 14B, the diameter of the outer periphery of the drive member 20B may slightly be smaller than that of the inner periphery of the rotor 14B. In this case, the elastic bodies 36, 38, 40, and 42 in the first and the second embodiments are formed on either of the inner peripheral surface of the rotor 14B and the outer peripheral surface of the drive member 20B, and the rotor 14B and the drive member 20B touch each other with pressures with the elastic bodies 36, 38, 40, and 42 intervening between them. Furthermore, if the elastic bodies 36, 38, 40, and 42 in the second embodiment are provided on the inner peripheral surface of the rotor 14B, the threaded holes 44 are formed in the rotor 14B similarly to the drive member 20 of the second embodiment, and the adjusting screws 46 are rotated and fixed into the threaded holes 44. Then, the tips of the adjusting screws 46 project onto the inner periphery side of the rotor 14B, and the tips of the adjusting screws 46 abut against the elastic bodies 36, 38, 40, and 42. On the other hand, if the elastic bodies 36, 38, 40, and 42 in the second embodiment are formed on the outer peripheral surface of the drive member 20B, the threaded holes 44 are formed in the drive member 20B similarly to the drive member 20 in the second embodiment, and the adjusting screws 46 are rotated and fixed into threaded holes 44. Then, the tips of the adjusting screws 46 project to the outer periphery side of the drive member 20B, and the tips of the adjusting screws 46 abut against the elastic bodies 36, 38, 40, and 42. By the tightening and loosening of the adjusting screws 46, the pressures of the elastic bodies 36, 38, 40, and 42 can be adjusted.

Fourth Embodiment

Figure 8:
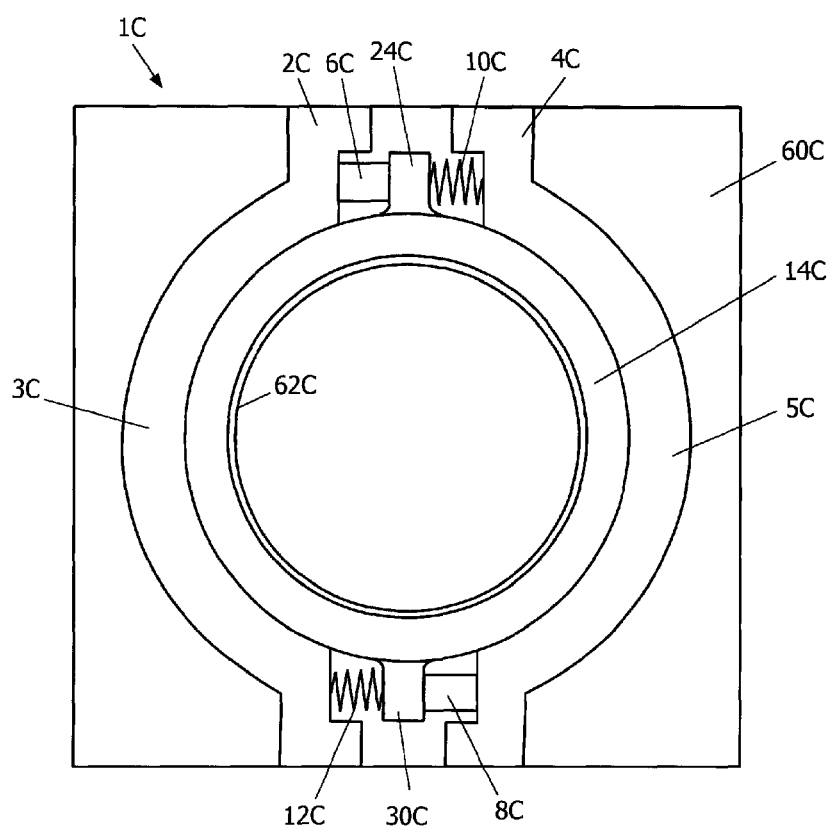
FIG. 8 is a plan view of a drive device according to a fourth embodiment of the present invention.
Figure 9:
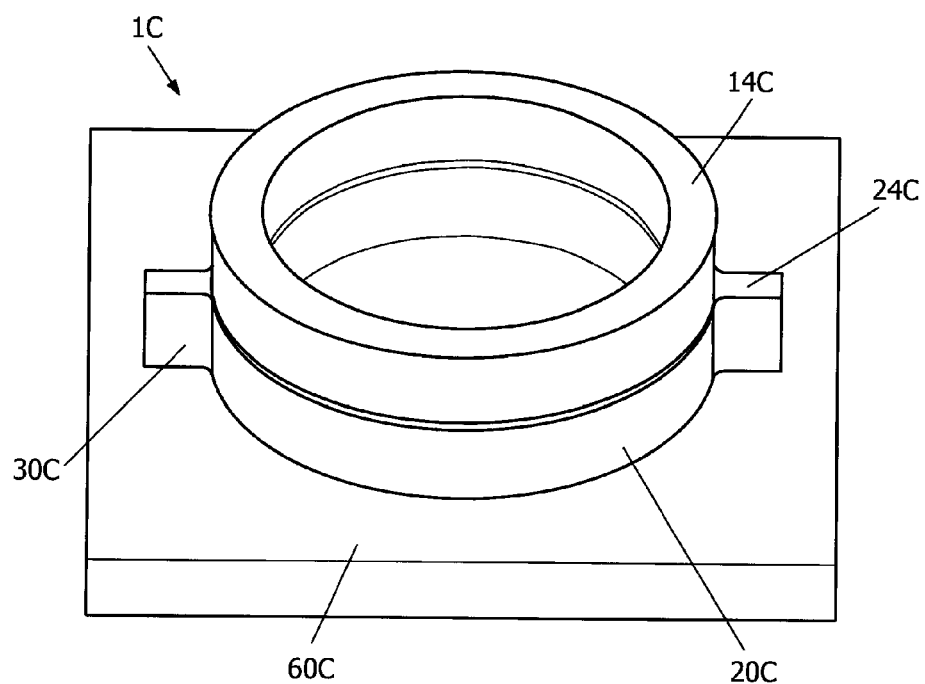
FIG. 9 is a schematic perspective view of the drive device according to the same embodiment.

FIG. 8 is a plan view of a drive device 1C of a fourth embodiment. FIG. 9 is a perspective view of the drive device 1C.

As shown in FIGS. 8 and 9, stators 2C and 4C are attached on one surface of a base plate 60C, and these stators 2C and 4C are provided with an interval between them. The stators 2C and 4C and the base plate 60C are similarly provided as the stators 2 and 4 and the base plate 60 in the second embodiment, respectively. In addition, the stators 2C and 4C are not shown in FIG. 9 in order that the members arranged between the stators 2C and 4C can easily be seen.

A ring-like drive member 20C is placed between the arc parts 3C and 5C of the stators 2C and 4C, respectively, on the base plate 60C. The outer peripheral surface of a drive member 20C contacts with the inner peripheral surfaces of the arc parts 3C and 5C, and the radial load of the drive member 20C is received by the arc parts 3C and 5C. The drive member 20C is thus supported by the arc parts 3C and 5c rotatably. In addition, the drive member 20C may be formed as a cylinder, a circular plate, or a column.

The drive member 20C includes drive arms 24C and 30C on its outer peripheral surface. These drive arms 24C and 30C extend from the drive member 20C in the external direction of the diameter. These drive arms 24C and 30C are arranged at positions opposed to each other with the center of the drive member 20C put between them. The drive arm 24C is arranged between the ends of the stators 2C and 4C on one side in their lengthwise directions, and the drive arm 30C is arranged between the other ends of the stators 2C and 4C in their lengthwise directions.

A piezoelectric element 6C is nipped between the end of the stator 2C on the one side in its lengthwise direction and the drive arm 24C in the tangential line direction of the rotation locus circle of the drive member 20C. The piezoelectric element 6C is fixed to the stator 2C and abuts against the drive arm 24C. In addition, a hemispherical projection may be provided at a part of the drive arm 24C at which part the drive arm 24C contacts with the piezoelectric element 6C.

A piezoelectric element 8C is nipped between the other end of the stator 4C in its lengthwise direction and the drive arm 30C in the tangential line direction of the rotation locus circle of the drive member 20C. The piezoelectric element 8C is fixed to the stator 4C and abuts against the drive arm 30C. In addition, a hemispherical projection may be provided at a part of the drive arm 30C at which part the drive arm 30C contacts with the piezoelectric element 8C.

The piezoelectric elements 6C and 8C expand and contract in the tangential line direction of the rotation locus circle of the drive member 20C, which direction parallel to the surface perpendicular to the rotation axis of the drive member 20C. Each of the piezoelectric elements 6C and 8C is made by laminating a plurality of unit piezoelectric bodies in its expansion and contraction direction. In addition, the piezoelectric elements 6C and 8C are not shown in FIG. 9 in order to make it easy to see the drawing.

A compression spring 10C is nipped between the end of the stator 4C on the one side in its lengthwise direction and the drive arm 24C. A compression spring 12C is nipped between the other end of the stator 2C in its lengthwise direction and the drive arm 30C. The compression springs 10C and 12C are made to be in slightly compressed states. The piezoelectric element 6C receives a compression load by the compression spring 10C, and the piezoelectric element 8C receives a compression load by the compression spring 12C. In addition, the compression springs 10C and 12C are not shown in FIG. 9 in order to make it easy to see the drawing.

A ring-like rotor 14C is superposed on the drive member 20C in the rotation axis direction of the drive member 20C, and the rotor 14C and the drive member 20C are concentrically arranged. The internal diameter of the rotor 14C is equal to the internal diameter of the drive member 20C, and the external diameter of the rotor 14C is equal to the external diameter of the drive member 20C. In addition, the rotor 14C may be formed in a cylinder, a circular plate, or a column.

The outer peripheral surface of the rotor 14C contacts with the inner peripheral surfaces of the arc parts 3C and 5C, and the radial load of the rotor 14C is received by the arc parts 3C and 5C. Thereby, the rotor 14C is rotatably supported by the arc parts 3C and 5C.

The rotor 14C and the drive member 20C are mutually attracted by magnetic forces, and the rotor 14C and the drive member 20C, hereby, touch each other with pressures. For example, both of the rotor 14C and the drive member 20C are magnets, and hereby the rotor 14C and the drive member 20C are mutually attracted. Alternatively, either of the rotor 14C and the drive member 20C is a magnet, and the other one is made of a magnetic substance. Hereby, the rotor 14C and the drive member 20C are mutually attracted. Alternatively, magnetic tapes are stuck on both of the lower surface of the rotor 14C and the upper surface of the drive member 20C, and hereby, the rotor 14C and the drive member 20C are mutually attracted. Alternatively, a magnetic tape is stuck on either of the lower surface of the rotor 14C and the upper surface of the drive member 20C, and the other surface is made of a magnetic substance. Hereby, the rotor 14C and the drive member 20C are mutually attracted.

Figure 10:
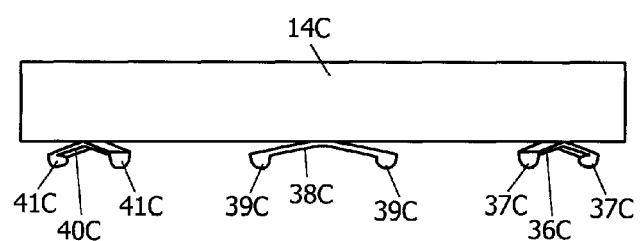
FIG. 10 is a side view of a rotor of the drive device according to the same embodiment.
Figure 11:
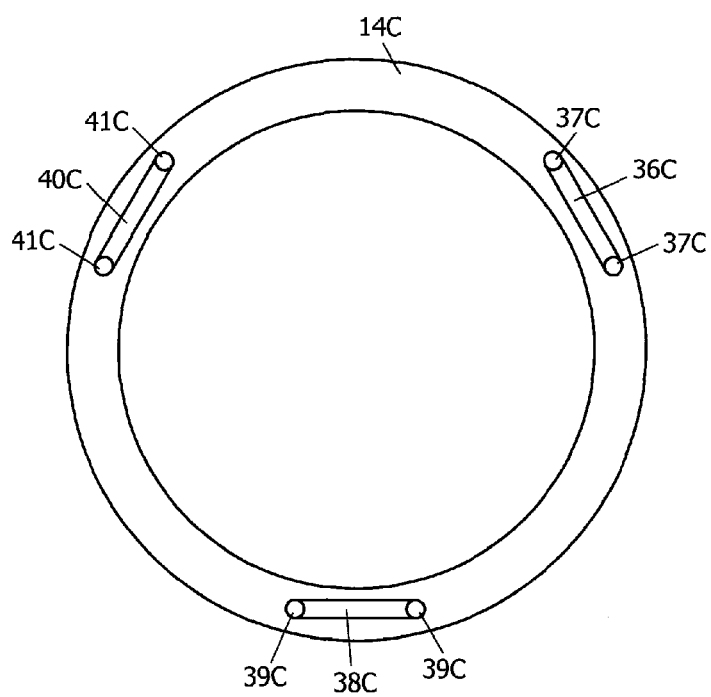
FIG. 11 is a bottom view of the rotor of the drive device according to the same embodiment.

FIG. 10 is a side view of the rotor 14C, and FIG. 11 is a bottom view thereof.

As shown in FIGS. 10 and 11, thin-plate-like elastic bodies 36C, 38C, and 40C are provided on the lower surface of the rotor 14C. The central parts of these elastic bodies 36C, 38C, and 40C are connected to the lower surface of the rotor 14C. These elastic bodies 36C, 38C, and 40C are bent in order that both the ends of the elastic bodies 36C, 38C, and 40C may be separated from the lower surface of the rotor 14C. Projections 37C, 39C, and 41C are provided to project from the lower surfaces of both the ends of these elastic bodies 36C, 38C, and 40C, respectively.

The elastic bodies 36C, 38C, and 40C are nipped between the rotor 14C and the drive member 20C. The elastic bodies 36C, 38C, and 40C are plate springs, and the respective projections 37C, 39C, and 41C of the elastic bodies 36C, 38C, and 40C touch the upper surface of the drive member 20C with pressures.

In addition, the elastic bodies 36C, 38C, and 40C may be provided on the upper surface of the drive member 20C in place of the lower surface of the rotor 14C.

Also the drive device 1C includes the control section 50, the memory 52, and the sensor 54 shown in FIG. 2, similarly to the drive devices 1, 1A, and 1B of the first, the second, and the third embodiments, respectively.

When control signals as shown in FIG. 3A are output to the piezoelectric elements 6C and 8C by the control section 50, the piezoelectric elements 6C and 8C repeat expansion and contraction, and the expansion speeds of the piezoelectric elements 6C and 8C are slower than the contraction speeds of the respective ones. Consequently, the rotor 14C clockwise rotates. On the other hand, when controls signals as shown in FIG. 3B are output to the piezoelectric elements 6C and 8C by the control section 50, the piezoelectric elements 6C and 8C repeat expansion and contraction, the expansion speeds of the piezoelectric elements 6C and 8C are faster than the contraction speeds of the respective ones. Consequently, the rotor 14C counterclockwise rotates.

This drive device 1C can be used as the power sources of the focusing mechanism, the zooming mechanism, and the retracting and extending mechanism of a lens unit.

The drive device 1C in this embodiment achieves operations and effects similar to those of the drive devices 1, 1A, and 1B of the first, the second, and the third embodiments, respectively.

Modifications

In addition, the present invention is not limited to the aforesaid embodiments, but various improvements and changes of their designs may be performed without departing from sprit and the scope of the present invention.

For example, tension springs may be used in place of the compression springs 10, 10B, and 10C. One end of a tension spring is hooked on each of the drive arms 24 and 24C and the other end of the tension spring is hooked on each of the stators 2 and 2C, in each of the first, the second, and the fourth embodiments, respectively. The tension spring extends in the tangential line direction of each of the drive members 20 and 20C along each of the piezoelectric elements 6 and 6C, respectively. If the tension spring is made in its slightly elongated state, a compressing load is applied to each of the piezoelectric elements 6 and 6C by the tension spring. In the third embodiment, one end of a tension spring is hooked on the stator 2B, and the other end of the tension spring is hooked on one end of the drive member 20B in its circumferential direction (the end against which the piezoelectric element 6B abuts). If the tension spring is made to be in a slightly elongated state, a compressing load is applied to the piezoelectric element 6B by the tension spring. Similarly, tension springs may be used in place of the compression springs 12 and 12C.

Furthermore, in the aforesaid first to the fourth embodiments, the compression springs 10, 12, 10B, 10C, and 12C are provided, and the drive members 20, 20B, and 20C rotate by the loads of the compression springs 10, 12, 10B, 10C, and 12C at the time of the contraction of the piezoelectric elements 6, 8, 6B, 6C, and 8C. But, the compression springs 10, 12, 10B, 10C, and 12C may not be provided. In this case, in the first, the second, and the fourth embodiments, if the piezoelectric elements 6 and 6C are fixed to the drive arms 24 and 24C, respectively, and the piezoelectric elements 8 and 8C are fixed to the drive arms 30 and 30C, respectively, then the contraction of the piezoelectric elements 6, 8, 6C, and 8C draw the drive arms 24, 30, 24C, and 30C to the piezoelectric elements 6, 8, 6C, and 8C, to rotate the drive members 20 and 20C. In the third embodiment, if both the ends of the piezoelectric element 6B are fixed to the stator 2B and the drive member 20B, respectively, the contraction of the piezoelectric element 6B draws the drive member 20B to the piezoelectric element 6B to rotate the drive member 20B.

Furthermore, although the elastic bodies 36, 38, 40, and 42 intervene between the rotor 14 and the drive member 20 in the aforesaid first and the second embodiments, the rotor 14 and the drive member 20 may directly touch each other with a pressure without the intervening of the elastic bodies 36, 38, 40, and 42 between the rotor 14 and the drive member 20.

All of the disclosures including the description, the claims, the drawings, and the abstract of Japanese Patent Application No. 2009-258470, filed on Nov. 12, 2009, are incorporated herein by reference.

Although various typical embodiments have been exemplified and described, the scope of the present invention is not limited to the matters of the embodiments described above. Consequently, the scope of the present invention is limited only by the following claims.

The invention claimed is:

1. A drive device, comprising:
    a stator;
    a rotatably-provided drive member;
    a piezoelectric element, which is nipped between the stator and the drive member in a tangential line direction of a rotation locus circle of the drive member, and expands and contracts in the tangential line direction at an expansion speed at a time of expansion and a contraction speed at a time of contraction, respectively, the expansion speed and the contraction speed being different from each other;
    a rotor, provided concentrically with the drive member to touch the drive member with a pressure; and
    an urging section to urge the drive member to compress the piezoelectric element along the tangential line direction of the rotation locus circle of the drive member;
    wherein one end of the piezoelectric element is fixed to the stator, and the other end of the piezoelectric element abuts against the drive member in an unfixed state; and wherein the drive member has a hemispherical projection at a part where the drive member contacts with the piezoelectric element.

2. A drive device, comprising:
a stator;
a rotatable-provided drive member;
a piezoelectric element, which is nipped between the stator and the drive member in a tangential line direction of a rotation locus circle of the drive member, and expends and contracts in the tangential line direction at an expansion speed at a time of expansion and a contraction speed at a time of contraction, respectively, the expansion speed and the contraction speed being different from each other;
a rotor, provided concentrically with the drive member to touch the drive member with a pressure; and
an elastic body intervening between the drive member and the rotor.

3. A drive device according to claim 2, further comprising:
an adjusting screw to be rotated and fixed into a threaded hole formed in either of the drive member and the rotor and to project from the threaded hole to the other one of the drive member and the rotor to abut against the elastic body.

4. A drive device, comprising:
a stator;
a rotatable-provided drive member;
a piezoelectric element, which is nipped between the stator and the drive member in a tangential line direction of a rotation locus circle of the drive member, and expands and contracts in the tangential line direction at an expansion speed at a time of expansion and a contraction speed at a time of contraction, respectively, the expansion speed and the contraction speed being different from each other; and
a rotor, provided concentrically with the drive member to touch the drive member with a pressure;
wherein the drive member is formed in a ring or a cylinder, and the rotor is inscribed in the drive member.

5. A drive device, comprising:
a stator;
a rotatable-provided drive member;
a piezoelectric element, which is nipped between the stator and the drive member in a tangential line direction of a rotation locus circle of the drive member, and expands and contracts in the tangential line direction at an expansion speed at a time of expansion and a contraction speed at a time of contraction, respectively, the expansion speed and the contraction speed being different from each other; and
a rotor, provided concentrically with the drive member to touch the drive member with a pressure,
wherein the rotor is formed in a ring or a cylinder, and the drive member is inscribed in the rotor.

6. The drive device according to claim 5, wherein:
a cutout is formed in the drive member; and
the piezoelectric element and the stator are arranged in the cutout.

7. A drive device, comprising:
a stator;
a rotatably-provided drive member;
a piezoelectric element, which is nipped between the stator and the drive member in a tangential line direction of a rotation locus circle of the drive member, and expands and contracts in the tangential line direction at an expansion speed at a time of expansion and a contraction speed at a time of contraction, respectively, the expansion speed and the contraction speed being different from each other; and
a rotor, provided concentrically with the drive member to touch the drive member with a pressure;
wherein the drive member and the rotor touch with each other in point-contact at plural positions.

* * * * *

UNITED STATES PATENT AND TRADEMARK OFFICE
CERTIFICATE OF CORRECTION

PATENT NO. : 8,314,532 B2
APPLICATION NO. : 12/942268
DATED : November 20, 2012
INVENTOR(S) : Hiroki Takahashi et al.

It is certified that error appears in the above-identified patent and that said Letters Patent is hereby corrected as shown below:

In the Claims:

Column 15, Line 9; Claim 2, Line 6:

Delete "expends" and insert --expands--.

Signed and Sealed this
Sixteenth Day of April, 2013

Teresa Stanek Rea
*Acting Director of the United States Patent and Trademark Office*